June 10, 1947. H. L. LAMBERT 2,422,103
DUPLEX CALCULATING MACHINE
Filed July 4, 1942 7 Sheets-Sheet 1

INVENTOR
Harry L. Lambert
by Parker, Prochnow & Farmer.
ATTORNEYS

June 10, 1947.  H. L. LAMBERT  2,422,103
DUPLEX CALCULATING MACHINE
Filed July 4, 1942  7 Sheets-Sheet 2
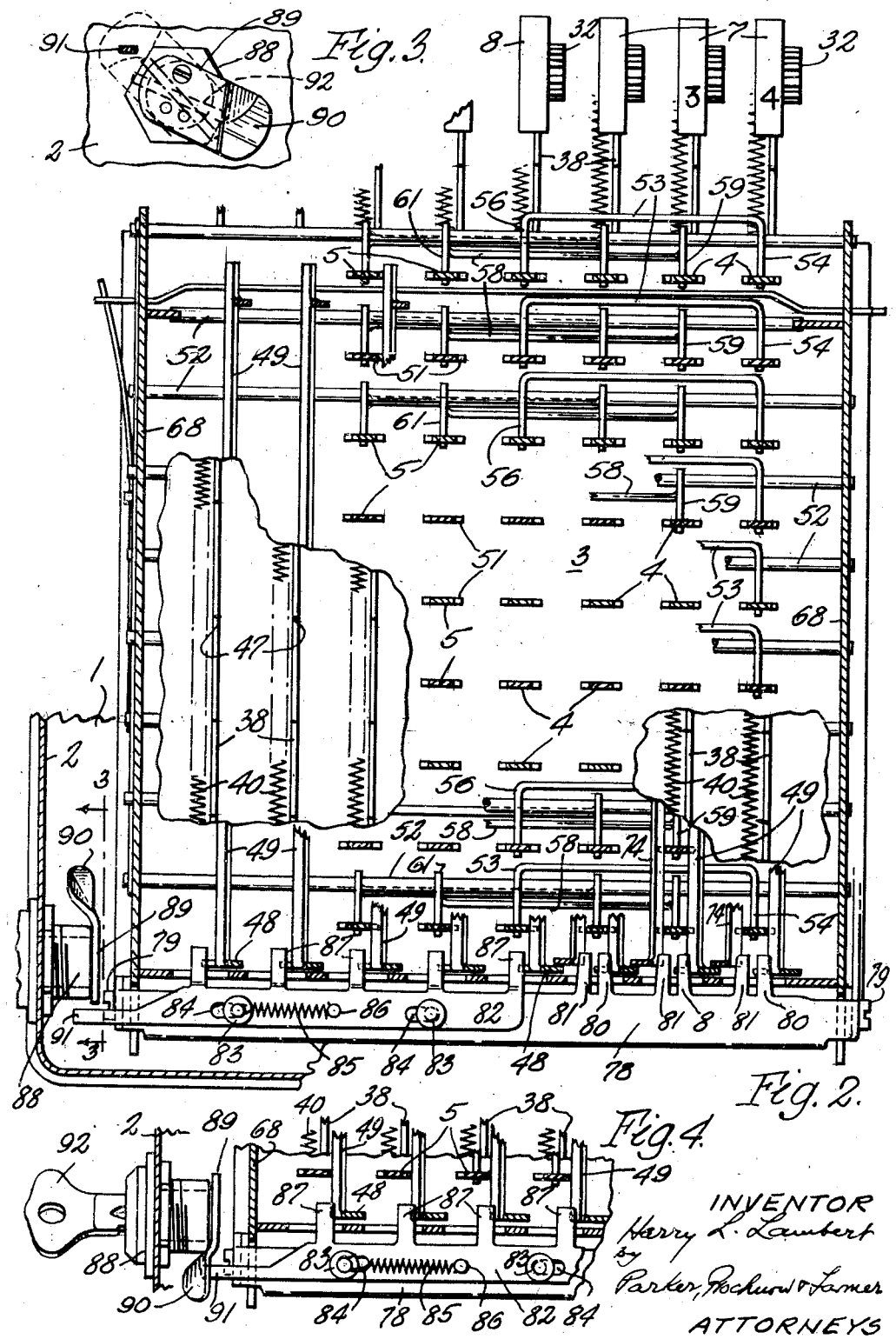
INVENTOR
Harry L. Lambert
by
Parker, Rockwood & Lamar
ATTORNEYS

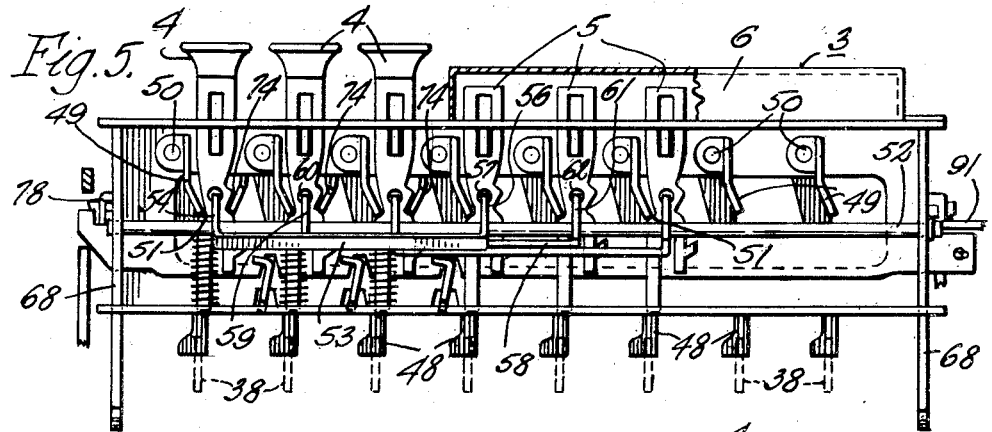
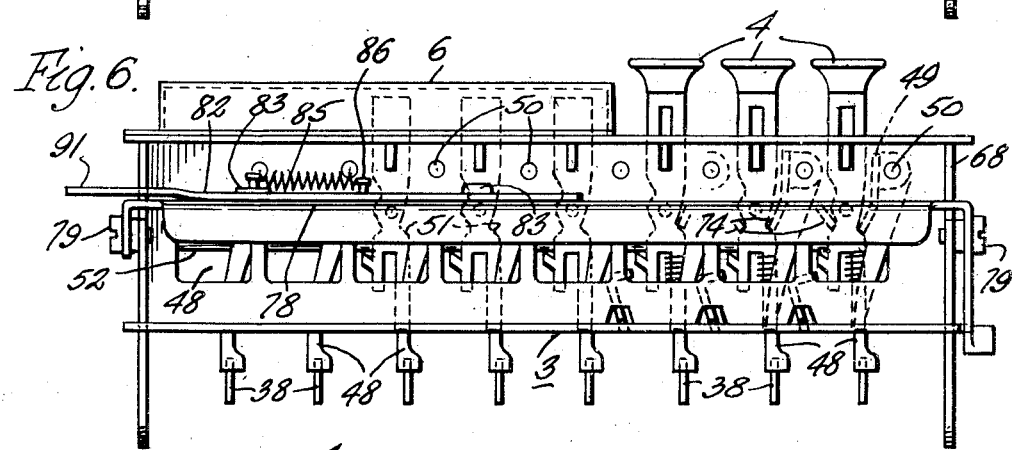
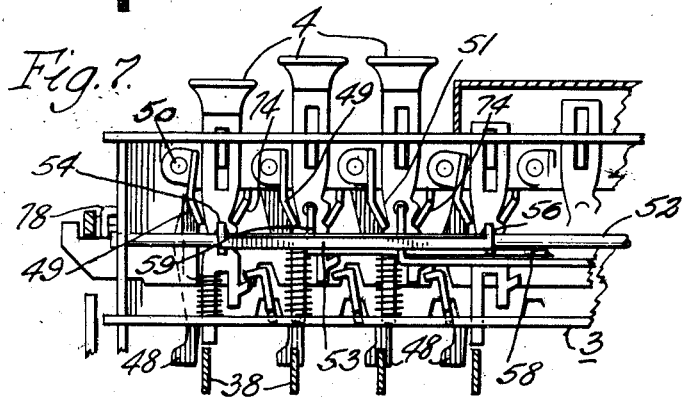
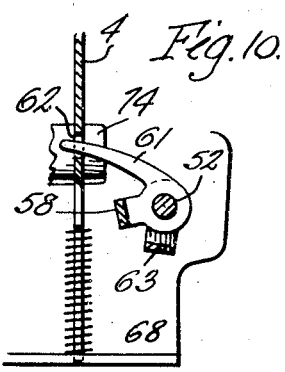
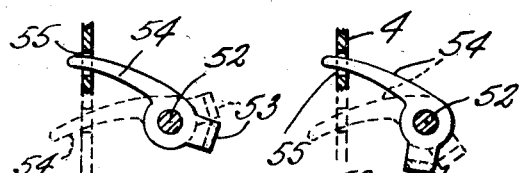
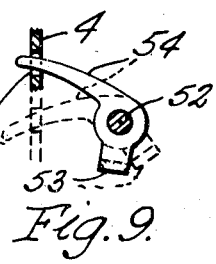

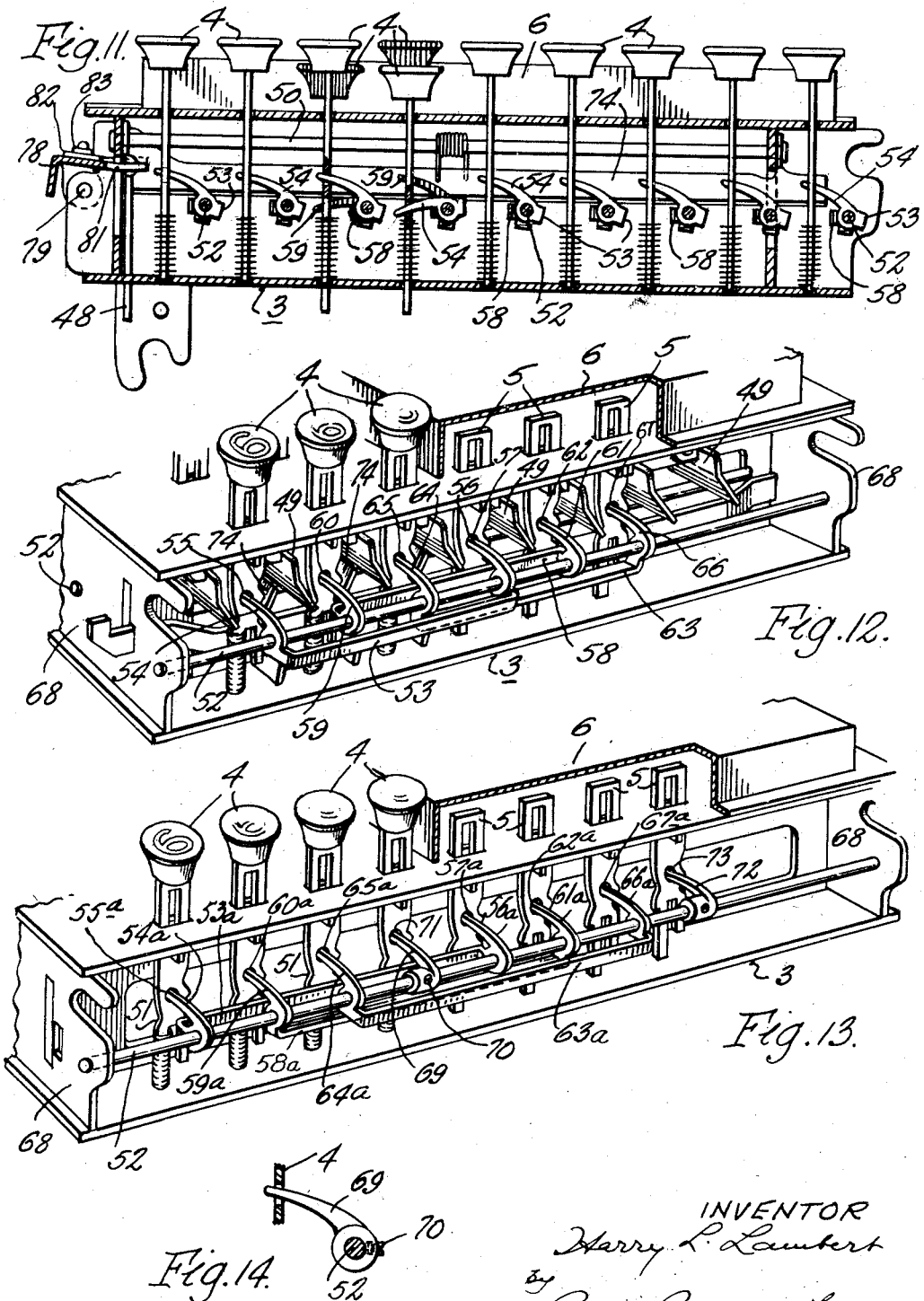

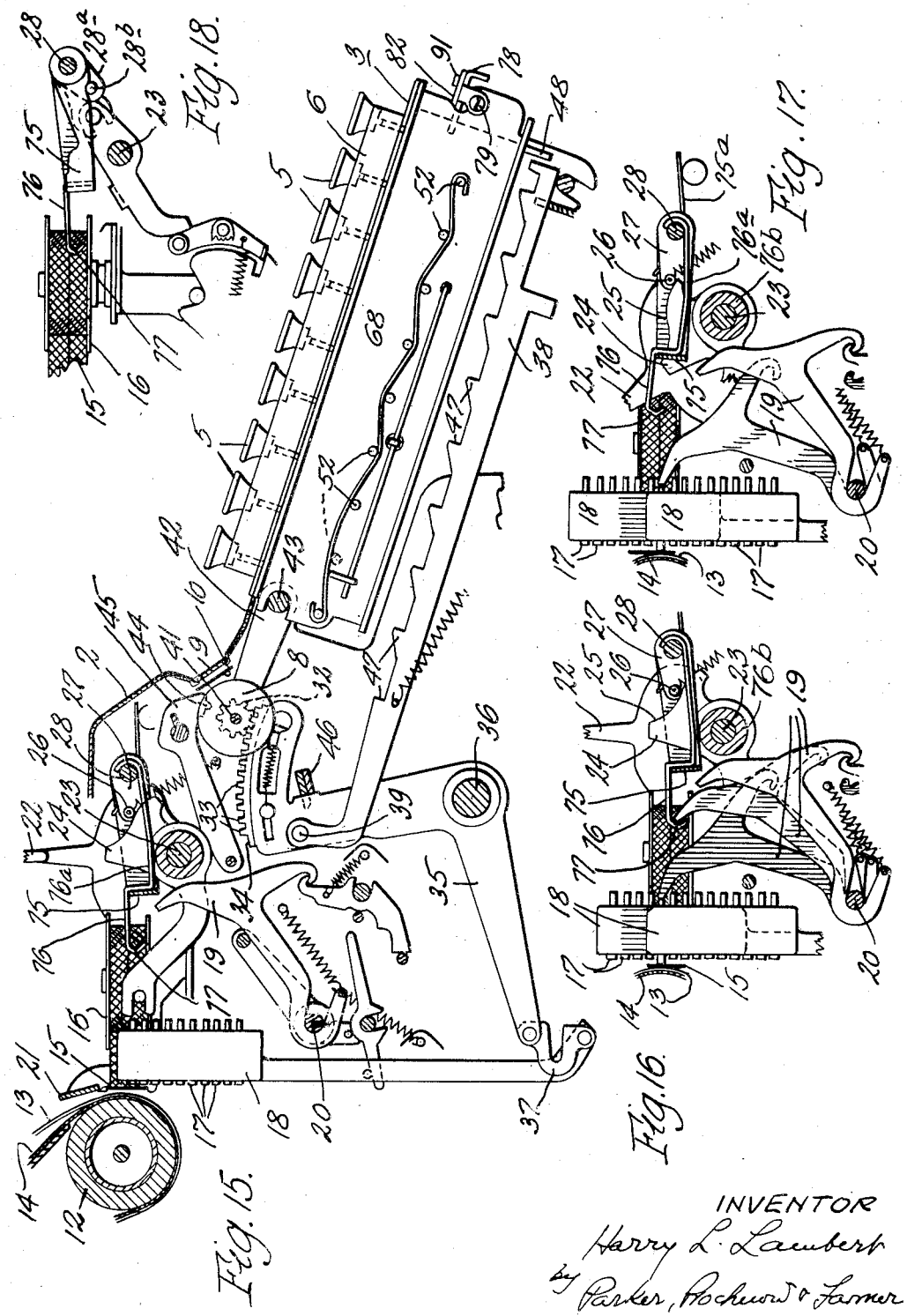

June 10, 1947.  H. L. LAMBERT  2,422,103
DUPLEX CALCULATING MACHINE
Filed July 4, 1942  7 Sheets-Sheet 6
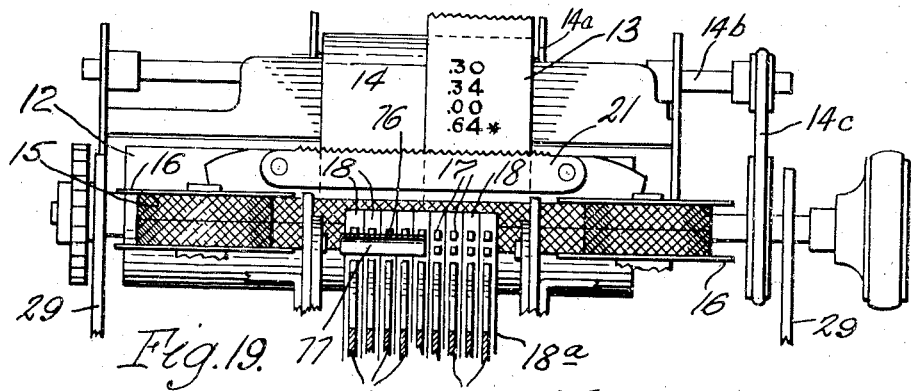
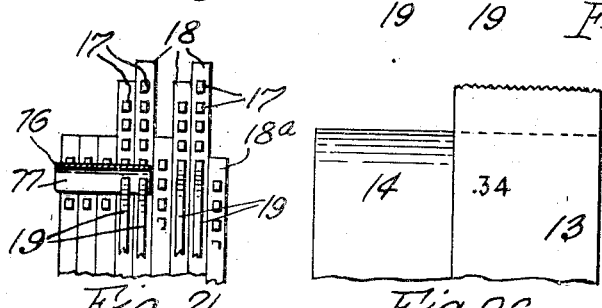
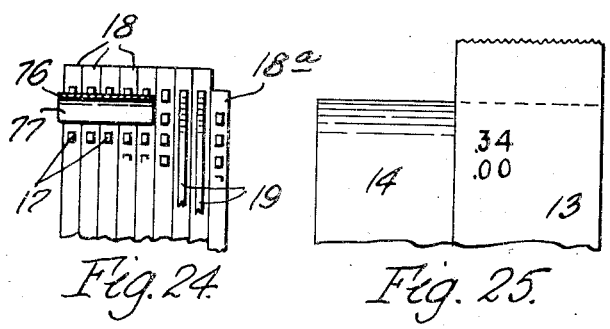
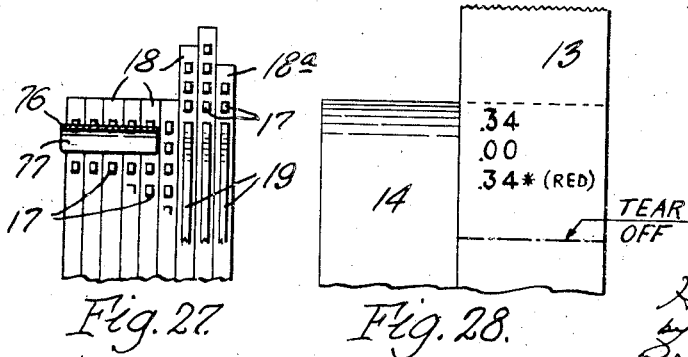
INVENTOR
Harry L. Lambert
by
Parker, Rockwood & Farmer.
ATTORNEYS June 10, 1947. H. L. LAMBERT 2,422,103
DUPLEX CALCULATING MACHINE
Filed July 4, 1942 7 Sheets-Sheet 7

INVENTOR.
Harry L. Lambert
By Parker, Rockwow & Farmer
ATTORNEYS.

Patented June 10, 1947

2,422,103

UNITED STATES PATENT OFFICE 2,422,103

DUPLEX CALCULATING MACHINE

Harry L. Lambert, Enfield, N. Y., assignor to Allen Wales Adding Machine Corporation, Ithaca, N. Y.

Application July 4, 1942, Serial No. 449,759

22 Claims. (Cl. 235—60)

This invention relates to calculating machines and more particularly to those that may be used as part of a cash register where it is desired to print items, totalize them, print such total and clear the primary totalizer after each transaction, and at the same time provide a retained record of the various items, the totals taken after each transaction, and also the grand total.

Machines of this type are particularly useful in connection with the operation of chain stores or establishments where a cashier computes the totals of all the items of each transaction in the adding machine portion, and a grand total is kept of all the items, which grand total is available only to a supervisor or authorized person having access to the grand totalizer.

An object of this invention is to provide an improved calculating device with which the various items of each transaction may be itemized and totaled, and all of the items accumulated in a grand totalizer, and which will be relatively simple, practical and inexpensive, and which may be operated in the usual manner of adding machines.

Another object of the invention is to provide an improved calculating machine having two totalizers, into one of which the items of any transaction are entered and the totalizer cleared in the usual manner, and into the other of which the same items may be entered, but that totalizer cleared only by an authorized person; which cannot be readily tampered with by the operator; and which ordinarily prints totals only for the individual items of each transaction, as entered in the primary totalizer, but can be set to print totals in the grand totalizer at any time when the totalizer is cleared by an authorized person.

Another object of the invention is to provide an improved calculating machine by which all the items of each transaction will be recorded in duplicate, with one record given to the customer and the other preserved for a supervising official, and with which the supervising official may also, on the same retained record, print a grand total of all of the transactions.

Other objects and advantages will appear from the folowing description of an embodiment of the invention, and the novel features will be particularly pointed out hereinafter in connection with the appended claims.

In the accompanying drawings:

Fig. 2 is a sectional plan through a portion of the machine at the keyboard to show certain features of the keyboard;

Fig. 3 is a sectional elevation of a part of the mechanism shown in Fig. 2, to show the locking mechanism, the section being taken approximately along the line 3—3 of Fig. 2;

Fig. 4 is a fragmentary sectional plan corresponding to a portion of Fig. 2 and illustrating the positions of the parts when a grand total is being taken and the grand totalizer is being cleared;

Fig. 5 is a rear end elevation, partly in section, of the keyboard of this machine;

Fig. 6 is a front end elevation of the keyboard;

Fig. 7 is a view similar to Fig. 5, but illustrating an intermediate step in the operation of the device;

Fig. 8 is a transverse sectional elevation through a part of the keyboard, to illustrate certain details of the connection between related keys of the different groups of keys;

Fig. 9 is a sectional elevation through another part of the keyboard to illustrate another connection between keys of the different groups.

Fig. 10 is a similar sectional elevation through still another part of the keyboard to illustrate still another connection between keys of the different groups;

Fig. 11 is a longitudinal sectional elevation through the keyboard removed from the machine, and illustrating the manner of operation of the connections between the keys of the different groups;

Fig. 12 is a perspective of one end of the keyboard illustrating the connections between keys of different groups;

Fig. 13 is a perspective similar to Fig. 12, but illustrating a modification of the keyboard which has a greater number of keys controlling the primary totalizer;

Fig. 14 is a sectional elevation through a portion of the device of Fig. 13, to show the connection between the keys of highest denomination of both keyboards;

Fig. 15 is a longitudinal sectional elevation through the machine, but with the keyboard in elevation, to show certain details of construction;

Fig. 16 is a sectional elevation through a part of the machine, showing the manner in which certain items are printed while accumulating a total in the primary totalizer, and also illustrating the manner in which the printing of those items by the printing mechanism relating to the grand totalizer is prevented;

Fig. 17 is a sectional elevation similar to Fig. 16, but illustrating the manner in which a grand total is printed;

Fig. 18 is a sectional elevation through a part of the machine, and illustrating a part of the conventional ribbon shift;

Fig. 19 is a sectional elevation through a portion of the machine, and illustrating a part of the printing mechanism;

Fig. 20 is a schematic diagram of the primary and grand totalizer dial wheels, showing the primary totalizer as cleared and a total retained in the grand totalizer;

Fig. 21 shows the operation of parts of the printing mechanism in printing the entry of a new item of 34¢ in the primary totalizer as the first item in a new transaction;

Fig. 22 shows the two paper strips and the first item of the new transaction printed thereon;

Fig. 23 shows the relative positions of the dial wheels of the two totalizers after the addition to both of them of the new item of 34¢;

Fig. 24 shows the position of parts of the printing mechanism during a blank stroke which is necessary in this particular type of machine in which this invention is incorporated, before a total is taken and the primary totalizer cleared;

Fig. 25 shows the printing of the zeros during such blank stroke;

Fig. 26 shows the position of the dial wheels during that stroke;

Fig. 27 illustrates the printing of the total in the primary totalizer while that totalizer is being cleared;

Fig. 28 is an elevation of the double paper record showing the printing thereon of the total in the primary totalizer;

Fig. 29 is an elevation of the dial wheels of the totalizers showing the primary totalizer as cleared, and the grand totalizer as still carrying the grand total;

Figure 1:
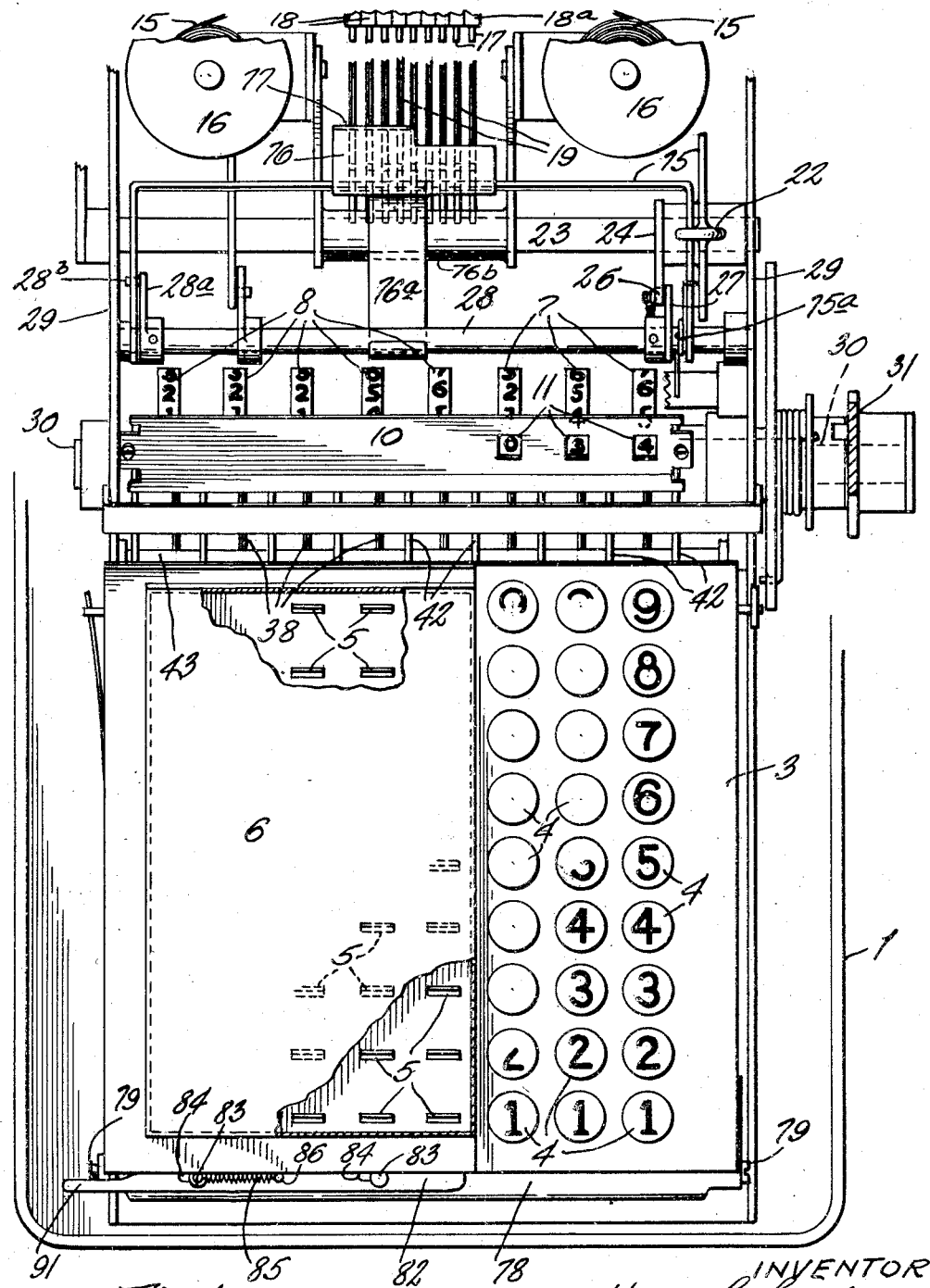
Fig. 1 is a gragmentary plan of parts of a calculating machine constructed in accordance with this invention, but having the cover removed therefrom.

In the illustrated embodiment of the invention, the machine in which the invention is incorporated is of the type disclosed in U. S. Patent No. 1,386,021 issued to H. C. Peters and Patent No. 1,854,875 issued to Nelson White, to which patents reference may be had for a full disclosure of details of calculating machines of this type which are not disclosed in the accompanying drawings. The details of those machines as shown in those patents which are not essential to an understanding of the application of the present invention to machines of this type, have been omitted in the interest of clarity in order not to obscure the details of the present invention as applied thereto.

In this type of machine, the mechanism is supported on a base member 1. A cover 2, Figs. 2 to 4, is disposed over the operating mechanism and is secured to the base in any suitable manner, such as by screws (not shown) passing between the cover and the base. Projecting upwardly through an opening in the top of the cover is a keyboard 3 having two groups of keys, the keys 4 of one group extending upwardly from the upper plate of the keyboard and terminating in buttons by which the keys may be operated. The keys 5 of the other group carry no operating buttons and their upper ends are concealed from view by an imperforate cover 6. The keys 4 and 5 are arranged in denominational rows running in a direction from front to rear, and the keys in each row are numbered from 1 to 9. A primary totalizer is provided for the keys 4 of the first group, and in this particular illustration, the primary totalizer comprises three dial wheels 7 having the usual or any suitable transfer or carryover mechanism between them. Also in the same machine is a grand totalizer having five digit or dial wheels 8 which also are connected to one another by suitable or the usual transfer or carryover mechanism. The cover or casing 2 is provided with a glass window 9, Fig. 15, which extends in front of the dial wheels of the two totalizers and through which the dial wheels of the totalizers are usually visible to enable the totals in the totalizers to be read.

In this particular machine, however, it may be desirable to conceal from view the totals in the grand totalizer, and for that purpose an imperforate plate 10, Figs. 1 and 15, is disposed immediately behind the window 9 so as to extend in front of the totalizer wheels, and conceal from view through the window 9 all of the totalizer wheels 8 of the grand totalizer. This plate 10, however, has openings 11 enabling the numerals on the dial wheels 7 of the primary totalizers to be viewed through the window 9.

This type of machine also employs a rotary platen 12, Fig. 15, on which a plurality of superposed paper strips 13 and 14 may be disposed, the paper strips being fed from a suitable source (not shown) around the platen 12 and then upwardly from the platen after leaving printing position. An inked ribbon 15 is wound on two spools 16 and is guided between them in a path in front of the printing position on the platen 12, as usual in this type of machine. The printing is performed by individual type members 17, a group of which are carried by each of a plurality of type bars 18, which bars 18 are disposed for movement vertically in front of the ribbon 15 adjacent the platen 12. These type members 17 are arranged in a row along each type bar 18, and by elevating each type bar 18 to selected positions, it is possible to place any of the individual type members 17 carried thereby in printing position. A symbol type bar 18a (Fig. 19) is provided, as usual, to print signs indicating the identification of the numbers printed.

Suitable hammers 19 are pivoted on a rod 20 and when released they are actuated by suitable springs in the usual manner to strike the individual type members in printing position and drive them against the ribbon and the paper strips 13 and 14. While two ribbons may be employed, with one of them between the paper strips 13 and 14, which is old in the art, I have illustrated for simplicity only the single ribbon and have applied a carbon paper coating or transfer coating to the rear face of the paper strip 13, so that all items printed on the strip 13 will be carbon printed upon the under strip 14.

As shown particularly in Figs. 19 to 28, the paper strip 13 which is nearest the ribbon is narrower than the under strip 14, and the strip 13 is so positioned as to have printed thereon only the items entered individually in the primary totalizer, and to receive a record of the totals in the primary totalizer when that totalizer is cleared, that is, when a total is taken from that totalizer.

Figure 33:
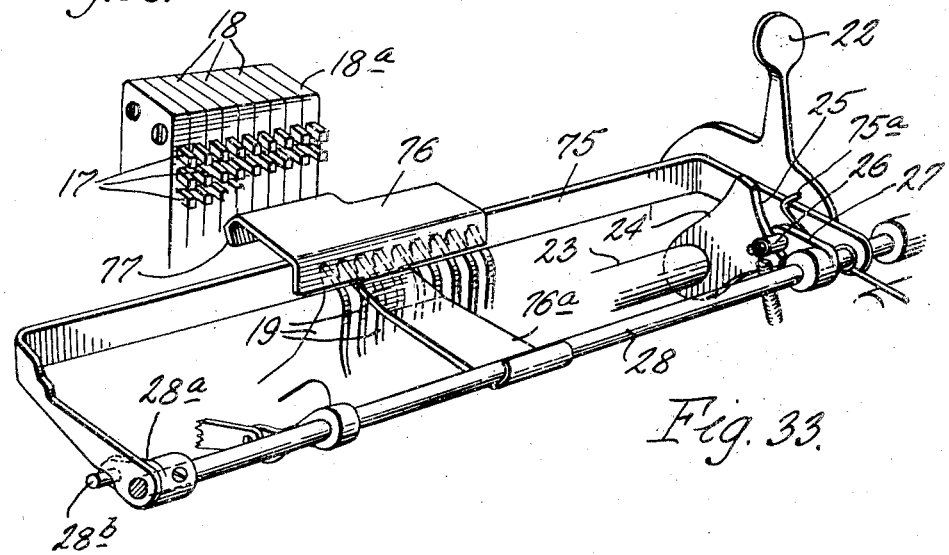
Fig. 33 is a perspective of part of the printing mechanism and illustrating the manner in which the hammers for printing grand totals are normally restrained during the entry of individual items, but are released by the total key.

A tear-off bar 21, Fig. 19, is provided just above printing position, so that the strip 13 may be torn off and handed to the customer after the items of each transaction have been recorded along with the total of that transaction, as shown in Fig. 19. The paper strip 14 is wound on a suitable roller 14a carried on a spool shaft 14b and driven by a belt 14c from the platen, as shown, so as to be preserved as a record of all of the individual transactions and the individual totals. After a number of items have been entered in the primary totalizer, and it is desired to clear that totalizer and print the total carried by that totalizer at the start of the clearance operation, a total and subtotal key 22, Figs. 1, 15 and 33, is operated. This key 22 is mounted on a shaft 23, Fig. 15, that extends crosswise of the machine. The mechanism by which the operation of the key 22 causes the taking of a total or subtotal is disclosed in said Peters and White patents, and has been omitted from the accompanying drawings to avoid confusion with the other parts which are illustrated. The totalizer key 22 carries a hub by which it is rotatably mounted on the rod or shaft 23, and on this hub is a cam plate 24, Fig. 33, having on its periphery a cam surface 25 against which rides a roller 26 mounted on an arm 27. The arm 27 (Fig. 1) is fixed on a rod 28 that extends across the machine and is rotatably mounted in the side frame plates 29 supporting the calculating mechanism.

Machines of this type also have a main operating shaft 30, Fig. 1, which is operated to cause the entry into the totalizers of the individual items set up in the group of keys 4. This shaft 30 may be operated by a suitable handle 31 when the machine is of the hand-operated type, or by a suitable motor (not shown) as common in the motor-operated type available in the open market. In this type of machine, as will be observed from said Peters and White patents above identified, each totalizer dial wheel corresponding to a denominational row of keys is provided with a pinion 32, Fig. 15, which normally meshes with rack teeth 33 on the end of a rack bar 34. The rack bar 34 extends arcuately and is mounted on the outer end of a bell crank lever 35 which is pivoted on a rod 36. One arm of the lever 35 extends rearwardly and is pivotally connected through a link 37 with the lower end of a related type bar 18, so that rocking of the lever 35 will simultaneously shift the type bar 18 upwardly and downwardly a proportionate extent. In simple addition machines, such as illustrated, the rack bar 34 may be mounted directly on the lever 35 as in the Peters patent, but in subtraction machines, the rack bar 34 is carried on a separate lever which is normally coupled to the lever 35, but is uncoupled when the machine is performing subtraction as shown in the White patent. An individual stop bar 38 is pivotally connected at 39 to the lever 35, and the stop bars 38 are arranged side by side so as to extend beneath the keyboard 3, as shown in Fig. 15.

An individual spring 40 is connected between each stop bar 38 and a suitable part of the frame, so as to yieldingly urge that stop bar in a direction toward the forward end of the machine. The totalizer wheels are carried on a shaft 41 (Fig. 15) supported by arms 42, which in turn are mounted on a frame rod 43. The totalizers may be shifted as a unit to carry the pinions 32 of the dial wheels into and out of mesh with the rack teeth 33. When the totalizer wheels are shifted by arms 42 to carry their pinions 32 out of mesh with the teeth 33, the pinions are carried into engagement with teeth 44 on a fixed frame 45. Thus, the dial wheels will be held against turning while their pinions are out of mesh with the rack teeth 33 of the different rack bars.

The levers 35 which carry the rack bars 34 are normally held in a retracted, initial, or rearward position by a common bar 46 which is operated from the main shaft 30 in a manner explained in the Peters patent, first forwardly to release the rack levers 35, and then, during the second half of a calculating operation, the bar 46 moves rearwardly and picks up the levers 35 and carries them all back to the normal position as shown in Fig. 15. Each stop bar 38 is provided with teeth 47 on its upper edge which selectively engage with and are stopped by the stem of any depressed key of the related denominational row. When the levers 35 are released by the bar 46, the springs 40 urge the stop bars 38 forwardly until the movement is limited by a depressed key stem as explained in said Peters patent. If no key in any denominational row is depressed, the stop bar 38 for that row is individually held against substantial movement by a zero stop 48, Figs. 5 to 7, and 15. These zero stops 48 are depending arms provided on the ends of levers 49, that are hinged on pivots 50.

Each lever 49 extends in a direction generally parallel to the related stop bar 38 along the denominational row of keys, and is urged by a suitable spring against the sides of the keys of that row. Normally each lever 49 engages in aligned notches 51 in the sides of the keys of that related row, when the keys of that row are all in normal retracted or upper positions, and this places the zero stop 48 depending therefrom in the path of the related stop bar 38 as shown in Figs. 5 to 7. When a key of any row is depressed, as shown by the left-hand key in Fig. 7, the lever 49 for that row will be cammed aside by the depressed key, and this will carry aside the depending zero stop 48. The stop bar 38 so released by that stop, will be free to move under the urging of its spring 40, as soon as the lever 35 connected to that stop bar is released by the main operating bar 46. This is explained in the Peters patent. If no key in a row is depressed, then the depending zero stop 48 for that row will remain in blocking position, and no substantial movement of the stop bar 38 for that row will occur, and hence no movement of the related rack bar 34.

There need be no carryover or transfer mechanism between the highest denomination dial wheel 7 in the primary totalizer and the lowest denomination dial wheel 8 in the grand totalizer. Inasmuch as it is desirable to enter each item in both totalizers simultaneously, and yet operate only one set of keys for each item, an interconnection has been provided between related keys of both groups, by which the depression of any key 4 in the right hand group in Fig. 1 will cause a simultaneous operation of corresponding keys 5 in the other or concealed group. One manner in which this may be accomplished will now be explained.

Referring now particularly to Figs. 5 to 14 (particularly Fig. 12), a plurality of rods 52 are disposed crosswise of the denominational rows of the keyboard, one for each horizontal row of keys. A bail 53 is rotatably mounted on each rod 52, with that rod 52 passing through the arms of the bail and with the crosspart of the bail running parallel to and slightly spaced from the rod 52 on which it is mounted. One arm 54 of that bail extends into an aperture 55 in one of the keys, such as the units denominational order of that horizontal row, so that when that key is depressed, it will rock the bail 53 on the rod 52. The arm 54 is sufficiently loose in the aperture 55, so that the bail 53 may rock freely while the key 4 through which the arm 54 extends moves in a straight line from the full line position to the dotted line position of Fig. 8. The arm 56 at the other end of bail 53 similarly extends into an aperture 57, Fig. 12, in the key 5 in the units denominational row, but also in the same horizontal row. Thus in Fig. 12, the bail 53 extends into the 9's key in the units denominational row in the other group of keys 5 protected by the cover 6.

Also mounted on the same rod 52 is a second bail 58, Fig. 12, which at one end carries an arm 59 projecting through an aperture 60 in the key 4 of the 10's denominational row. At its other end the same bail 58 has an arm 61 which extends loosely through an opening 62 in the key 5 of the 10's denominational row of the second group protected by the cover 6. Thus, if any key 4 in the 10's denominational row is depressed, it will act through its bail 58 to similarly depress and hold depressed the corresponding key 5 in the 10's denominational row of the group of keys protected by the cover 6. Similarly, a third bail 63 is hinged on the same rod 52 and at one end it carries an arm 64 which extends into an opening 65 in the key 4 in the 100's denominational row. The other end of the bail 63 carries an arm 66 which extends through an opening 67 (Fig. 12) in the key 5 of the 100's denominational row of the second group of keys protected by the cover 6. Thus when any key 4 is depressed, it automatically depresses and holds depressed a corresponding key in the group of keys 5 protected by the cover 6.

In Fig. 13, the arrangement is similar, except that there are four rows of keys 4 and four rows of keys 5, and parts which functionally correspond to those of Fig. 12 are given the same reference numerals with the letter $a$ added. In this case the rod 52 may be rotatably mounted in the side plates 68 of the keyboard, and an arm 69 will be fixed, such as by set screw 70, to the shaft 52 and will extend through an opening 71, in the highest denominational key 4 in the same horizontal row. A second arm 72 will also be similarly fixed on the shaft 52 and will extend through an opening 73 in the highest denominational key 5 in the same horizontal row. Other similar arrangements can be made for any desired number of denominational keys or rows of keys depending upon the desired capacity of the machine. Otherwise, the arrangement of Fig. 13 is the same as in Fig. 12.

Each key 4 of the group which is manually operated is provided with means to hold it in latched or depressed position, as explained in said Peters and White patents, this being accomplished by a common bar 74, Fig. 5, for each denominational row of keys, which engages alternately in two notches of the keys of that row. When any key 4 in a denominational row is depressed, it is latched in depressed position by the common bar 74 for that row, each bar 74 being yieldingly urged against the sides of the keys 4 of that row. After any key in that row is depressed, the camming of the bar 74 of that row by a second depressed key will release the first key and allow it to rise. This is explained in said Peters patent.

Latches are provided, however, only for the keys 4 of the manually operated group, and since the keys of that group are all connected with corresponding keys of the hidden group, each key of the latter group will be held depressed by the latch which holds the corresponding primary key depressed, and when the primary key is raised, the corresponding key in the hidden group will be released and raised. Because of this arrangement, the same items or numbers will be simultaneously set up in the keys of both groups, and then when the main shaft is operated, the same items will be entered or run into the primary totalizer and the grand totalizer.

As explained above, when any stop bar 38 is released, it tends to move forwardly to carry its rack bar 34 forwardly and at the same time to shift the type bar 18 connected thereto into proper printing position. Unless otherwise restrained, those hammers which are related to stop bars which have been released, or those to the right of stop bars that have been released, will operate at the proper time and operate the individual type members 17 of the various type bars that are in printing position to print the corresponding numbers through the ribbon 15 upon the paper strips carried by the platen 12. It is desirable not to print the individual items entered in the grand totalizer from their associated type bars because they are being entered on the paper strip 14 by transfer from the upper strip 13, and therefore, mechanism has been provided to prevent the hammers from causing printing by the type members carried by the type bars related to the grand totalizer, while items are being entered in both totalizers. For this purpose, the rod 28, which is rocked whenever the total key 22 is operated, also carries, pivoted thereon, a bail 75, Figs. 15 and 33, and a plate 76 is secured to this bail 75 so as to extend rearwardly therefrom toward the platen. At its free end, plate 76 is provided with a downwardly turned flange 77 which, when the total key 22 is in its normal position, will be in the path of the hammers 19 that engage the type members 17 on the type bars 18 that are connected to the levers 35 which are associated with the dial wheels of the grand totalizer.

The bail 75 may be caused to assume its hammer blocking position, by the engagement of an extension 76$a$ of the plate 76 which bears against a sleeve 76$b$ on the shaft 23, see Figs. 1 and 15. The extension 76$a$ is yieldingly urged against the sleeve by a spring 75$a$ (Fig. 17) which is coiled about the rod 28 and extends over the upper edge of the right hand leg of the bail 75, see Fig. 33.

The rocking of the bail 75 from its blocking position Fig. 16 to its raised position Fig. 17 under the influence of the total key 22 when the latter is operated, is effected by an arm 28$a$ fixed on the rod 28 which has a pin 28$b$ extending beneath the other leg of the bail 75. When the rod 28 is rocked, through cam 24 and arm 27 as described, the pin 28$b$ will engage and swing the bail upwardly. When the total key 22 and the cam 24 are returned to their inoperative positions as the result of taking a total, the arm 28$a$ and its pin 28$b$ will swing downwardly followed by the bail 75 under the action of the spring 75$a$, and the bail will come to rest in blocking position by reengagement of the extension 76a with the sleeve 76b.

The flange 77 is coextensive only with that group of hammers 19 which are associated with the type bars related to the grand totalizer, and will not interfere with the operation of the hammers which engage the type members of the type bars that print the items entered in the primary totalizer. Thus, when the hammers 19 are released, those which would normally print the items entered in the grand totalizer will be stopped short of engagement with the type members 17 by the flange 77. If, however, the total key 22 is operated to cause the printing of a total or subtotal, or to clear the primary totalizer in case a total is taken, the bail 75 will be elevated to carry the flange 77 out of the path of the hammers 19 and thus allow all of the hammers 19 to engage the type members 17 in the type bars 18 that have been elevated into printing position. The release of the hammers at the proper time is explained in said Peters and White patents and will not be repeated here. The stoppage of the hammers by the flange 77 is shown in Fig. 16, and the elevated position of the plate 76 out of the path of the hammers is shown in Fig. 17.

It is unnecessary to have more denominational rows of keys 5 than there are similar rows of keys 4, but it is desirable to have a substantially larger capacity in the grand totalizer, so as to accumulate larger totals than is possible in the primary totalizer. In resetting the dial wheels of the grand totalizer back to zero, in the taking of a grand total, stop bars are desirable for the additional dial wheels to which those stop bars relate. When taking a total of either totalizer, the zero stops 48 for all the stop bars 38 related to the dial wheels of that particular totalizer must be released.

When the total key 22 is operated, it also rocks, in the manner explained in said Peters and White patents, a plate 78, Figs. 2, 4, and 6, which is pivotally supported on screws 79 carried by the side frame plates 68 of the keyboard. This plate 78 carries fingers 80 and 81 (Fig. 2) alined approximately with each denominational row of keys 4. The fingers 80 project through the front end plate of the keyboard into a position adjacent the related zero stop lever 49, and are operable, when plate 78 is rocked, against the front end of the lever 49 to cam it in a direction to shift its zero stop 48 out of the path of the related stop bar 38. Each finger 81 similarly projects through the front end plate of the keyboard into a position adjacent each lever 74 which latches the keys in depressed positions. When the plate 78 is rocked through operation of the total key, the fingers 81 will all move downwardly and cam the levers 74 aside to release all keys that are then depressed. The fingers 80 and 81 are provided only for the keys 4.

An auxiliary plate 82, Fig. 2, is disposed upon the upper surface of the plate 78 and confined thereto by headed studs 83, the shanks of which pass through elongated slots 84 in the plate 82. The plate 82 is, therefore, slidable endwise along the plate 78 to an extent permitted by the slots 84 in plate 82. A helical spring 85 is connected at one end to a pin 86 carried by the plate 82, and at its other end to one of the studs 83 and yieldingly and resiliently urges the plate 82 to the left in Fig. 2, into the full line position of that view. This plate 82 carries fingers 87 which also project through openings in the front end plate of the keyboard frame into positions alongside the zero stop levers 49.

When the plate 82 is in the position shown in Fig. 2, the fingers 87 are far enough away from the levers 49 so that when the plate 78 is rocked, the rocking of plate 82 therewith will not cause the fingers 87 to engage and cam aside the levers 49. When the plate 82 is shifted to the right in Fig. 2 against the action of spring 85, and into the position shown in Fig. 4, the fingers 87 will all be carried into positions adjacent the levers 49, and then when the plate 78 is rocked by operation of the total key 22, the fingers 87 will engage and cam aside the depending zero stops related to the totalizer wheels of the grand totalizer. In such a case, both totalizers will then be cleared at the same time and by similar operations.

The plate 82 is entirely within and concealed by the casing or cover 2 of the machine, and provision is made to shift it into the position in which it will be effective to release the stop bars and the means connected thereto enable the grand totalizer to be cleared by an authorized person. For that purpose, a suitable lock device 88 (Figs. 2 to 4) is secured in the cover 2 adjacent the front end thereof. The rotary member of this lock 88 carries a cam plate 89 having a beveled surface 90, so positioned that when cam 89 is rotated, the beveled surface 90 will engage with end of tail 91 of the auxiliary plate 82 and cam the auxiliary plate to the right in Fig. 2, so as to shift the fingers 87 into positions where they will be effective to cam aside the zero stop levers 49 related to the stop bars for the grand totalizer when the plate 78 is rocked. Then when the plate 78 is rocked in clearing the primary totalizer, the grand totalizer will also be cleared by the same operation.

Figure 31:
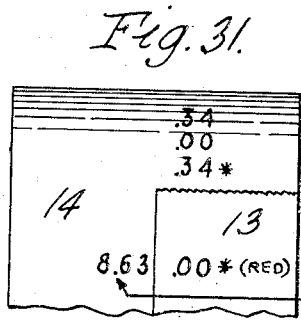
Fig. 31 is an elevation of the double paper strips showing the manner in which the grand total is printed.
Figure 32:
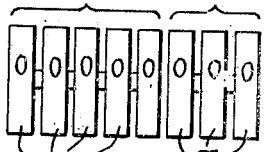
Fig. 32 shows the positions of the dial wheels after a grand total has been taken.

A suitable key 92 may be provided for the lock 88 to rotate the member 89 as usual in this type of tumbler or other lock, and thus shift the cam member 89 from the normal position shown in Fig. 2 to the operative position shown in Fig. 4. Only authorized persons carry the keys 92, and when they desire to ascertain the total in the grand totalizer, print that total, and reset that totalizer back to zero, the key 92 is inserted into the lock 88 and turned to cause the cam surface 90 to force plate 82 endwise. Then the total key and main shaft 30 are operated to clear the primary totalizer of any sum therein, and the same operation will also clear the grand totalizer and print the grand total to the left of the upper strip 13, upon the lower strip 14, as shown in Fig. 31.

The conventional ribbon shift mechanism is shown in Fig. 18, so that when totals are printed they will be printed in red. The ribbon shift mechanism is shown, for example, in the White patent above identified.

In the operation of the machine incorporating this invention, and assuming that both totalizers are at zero, the operator selectively operates keys 4 to set up the amount of an item of a transaction. In doing so, the corresponding keys 5 of the other group are depressed and held in depressed position. The operator then operates main shaft 30 by the handle 31, or by a motor, through a given angular arc and back to starting position, during which amounts determined by the depressed keys are run into both totalizers, and the depressed keys released and returned to normal position. The numbers run into the primary totalizer will appear through the openings 11 behind the main window 9, but the numbers on the dial wheels of the grand totalizer will not be visible through the window 9.

At the same time that the numbers were run into the primary totalizer, the printing mechanism also operated to print the same numbers on the upper strip 13, and by transfer also on the underlying part of the paper strip 14 during the same printing operation. The type bars 13 which are associated with grand totalizer were also raised into positions to print the same item on the strip 14 in horizontal alinement with the item printed on the strip 13, but the hammers which would strike those type bars were stopped by the flange 77, and consequently, the number representing the item was only printed once on each of the strips. The operator continues to set up other items by selective depression of the keys 4 in the same manner and to operate the main shaft 30 to cause them to be entered into both totalizers. When that transaction is completed, the total key 22 is pushed rearwardly into a position to take the total, and this, in a manner explained in said Peters and White patents, will clear the primary totalizer and print the total on the paper strip 13, as shown in Fig. 28. This strip 13 containing the items and total may be torn off, as shown in Fig. 28, and handed to the customer.

Additional transactions are similarly itemized and totaled in the same manner, and all of these items are entered into the grand totalizer. As explained above, when the total key 22 is operated to take a total in the primary totalizer, it causes only the primary totalizer to be cleared for the reason that there are no fingers on the plate 78 to release the zero stops for the stop bars cooperating with the dial wheels of the grand totalizer, and hence the zero stops for the grand totalizer stop bars will prevent these stop bars and their associated mechanism from operating to clear the grand totalizer. Since there is no movement of those stop bars, there will be no elevation of the type bars connected to those stop bars, and, because of the usual zero printing elimination mechanism, there will be no printing, even though none of the hammers are restrained by the flange 77 of the plate 76. A number of such successive items are shown in Figs. 20 to 23, and the blocking of the hammers that print the items associated with the grand totalizer is shown in Fig. 16, whereas the printing of the grand total is shown in Fig. 17.

Figure 30:
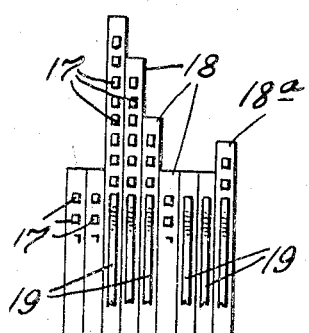
Fig. 30 is an elevation of part of the printing mechanism when printing a grand total while the grand totalizer is being cleared.

When a supervisor or authorized person calls and desires to ascertain the total in the grand totalizer that has been accumulated therein since the grand totalizer was last cleared, such supervisor merely inserts his key 92 in the lock 88, turns the lock to carry the beveled surface 90 against the tail 91 of the auxiliary plate 82, thus forcing the plate 82 endwise into the position shown in Fig. 4 from the normal position shown in Fig. 2. Then the total key 22 is operated rearwardly, following which the shaft 30 is operated either by the handle or by a motor, and the total in both totalizers is printed and both totalizers are cleared owing to the fact that the fingers 87 on the plate 82 during this operation cam aside the zero stops that control the stop bars of the grand totalizer. This enables the grand totalizer to be cleared and a number corresponding to the number carried by that grand totalizer at the start of the clearance thereof printed on the paper 14 as shown in Fig. 31. The printing of the grand total is shown in Fig. 30, and because the total key 22 is operated for this purpose, the hammers are unrestrained by the flange 77 of plate 76, which was elevated simultaneously with the operation of the total key 22.

The supervisor then turns the key 92 back into its original position which carries the beveled surface 90 out of engagement with the tail 91 of plate 82, whereupon the spring 85 returns the auxiliary plate 82 to its position shown in Fig. 2, where the fingers 87 cannot shift the zero stops for the stop bars of the grand totalizer whenever a primary total is taken and the primary totalizer cleared.

In this manner the attendant cannot clear the grand totalizer, or ascertain the amount therein, for this can be done only when the supervisor or other authorized person possessed with the proper key operates the lock and sets the mechanism to clear both totalizers and print the totals. The paper strip 14 thus carries all items of each transaction, the total of each transaction, and the grand total which is taken by the authorized person possessing the key.

It will be understood that various changes in the details and arrangements of parts, which have been herein described and illustrated in order to explain the nature of the invention, may be made by those skilled in the art within the principle and scope of the invention as expressed in the appended claims.

I claim:

1. A calculating machine comprising a primary totalizer, a grand totalizer, means for entering the same, selected numbers simultaneously in both of said totalizers in successive cycles of operation, means for clearing said primary totalizer in another cycle of operation, means coupled to a part of said last named means and shiftable while so coupled into and out of a position in which it causes a clearance of said grand totalizer in the same cycle of operation in which the primary totalizer is cleared, a housing enclosing all of the foregoing, a platen, means for feeding superposed paper strips past a selected zone of said platen, and a lock controlled element extending through and mounted in said housing and accessible for operation, from the outside of said housing, and effective when operated to move said shiftable means into said position and cause a clearance of said grand totalizer in the same cycle of operation with said primary totalizer, said housing having a primary sight window therein through which the numbers on said primary totalizer only are visible to the operator, said housing also closing the grand totalizer from view from outside of the housing, means for printing in a single column only on both of said strips the items entered in both of said totalizers and the totals carried by said primary totalizer each time that totalizer is cleared, said means also printing on one of said strips only the total carried by the grand totalizer at the time that totalizer is cleared.

2. In a calculating machine, a primary totalizer, a separate grand totalizer, a manually operable keyboard, means controlled by said keyboard for entering amounts into said primary totalizer, a second keyboard, means controlled by said second keyboard for entering amounts into said grand totalizer, means connecting said keyboards operable by actuation of said manually operated keyboard for automatically actuating said second keyboard to cause the entry into said grand totalizer of an amount corresponding to the amount entered into said primary totalizer in the same cycle of operation, means rendered effective at will for clearing said primary totalizer in a separate cycle of operation, and selectively operated means cooperating with said last named means for causing at will a clearance of said grand totalizer solely in the same cycle of operation as said primary totalizer.

3. In a calculating machine, a primary totalizer having denominational dial wheels, a separate grand totalizer also having denominational dial wheels, a plurality of reciprocating stop bars, one bar for each dial wheel, a row of keys for selectively controlling the movements of each of said bars, means responsive to the movement of each bar for operating its related dial wheel, the keys controlling the bars for the primary totalizer comprising one group, and the other keys comprising another group, means for connecting corresponding keys of said groups so that operation of said keys of said one group will cause similar movement of the keys of the other group, an operating shaft, means rendered effective by said operating shaft for releasing the stop bars and causing the entry into both totalizers of numbers determined by the particular keys of said one group that are operated, a single total clearance key, means controlled by said clearance key for clearing said totalizers concurrently at any time in a separate cycle of operation, means for selectively modifying said last named means to prevent clearance of said grand totalizer with said primary totalizer, and means for printing the numbers set up in said keyboard by the keys of said one group at each following operation of said shaft, and for printing the totals carried by each totalizer when a clearing operation of that totalizer is caused.

4. In a calculating mechanism, a primary totalizer, a grand totalizer, a keyboard having two similar groups of keys, one for each totalizer, with the keys of each group arranged in denominational rows of values 1 to 9, means interconnecting each key of one group with the corresponding key of the other group, an individual stop bar for each denominational row of keys, means yieldingly urging each stop bar in one direction until stopped by any depressed key in that denominational row, a zero stop for each bar normally preventing any substantial movement of that bar, means operated by any key of any denominational row for moving the zero stop for the stop bar of that row to release that stop bar, means controlled by each stop bar for entering numbers into a related totalizer depending upon the extent of its movement, a main shaft, means operated by said shaft for returning all stop bars to initial position just prior to the conclusion of a cycle of operation of said shaft and for releasing said bars at the start of a new cycle of operation of said shaft, a single total key, and means operated by said total key for moving aside the zero stops for all of said stop bars and cause simultaneous clearance of both totalizers, and having a portion thereof that moves aside the zero stops for the stop bars that are related to said grand totalizer, said portion being selectively shiftable relatively to the remaining portion into a position in which it clears the zero stops for the stop bars related to said grand totalizer, to prevent clearance of said grand totalizer with said primary totalizer.

5. In a calculating machine, a primary totalizer, a separate grand totalizer, a keyboard with a single set of manually operated keys, means controlled by said set of keys for always running all numbers set up by operation of said keys into both of said totalizers simultaneously in the same cycle of operation, a total key, means controlled by said total key for causing a clearance of said primary totalizer in a separate and different cycle of operation, a control element continuously coupled to a part of said clearance causing means and always operable therewith and shiftable, while so coupled, into and out of a selected position, means rendered effective by said element when in said selected position for causing a clearance of said grand totalizer in the same cycle of operation with said primary totalizer, and manually controlled means for selectively shifting said coupled means into and out of said position.

6. In a calculating mechanism, a primary totalizer, a grand totalizer, a keyboard having two groups of keys, one for each totalizer with the keys of each group arranged in denominational rows, one of said groups of keys having operating buttons by which the keys in different rows may be operated selectively to set up numbers, means preventing access to the keys of the other group, means interconnecting each key of said one group with a corresponding key of the other group, whereby the setting up of a number in one group of keys will cause a corresponding number to be set up in the other group of keys, an individual stop bar for each denominational row of keys, means yieldingly urging each stop bar in one direction until stopped by any depressed key in that denominational row, a zero stop for each bar normally preventing any substantial movement of that bar but movable aside to release that bar, means operated by any key of each denominational row for moving the zero stop for the stop bar of that row to release that stop bar, means controlled by each stop bar for entering a number into the related totalizer depending upon the extent of movement of that stop bar, means for returning all stop bars to initial position just prior to the conclusion of a cycle of operation and for releasing said bars at the start of a new cycle of operation, a member mounted to extend crosswise of the rows of keys, mounted for limited movement, and having portions engageable with and moving aside the zero stops of said one group of keys, an element mounted on said member for limited movement thereon and having portions engageable with and moving aside each of the zero stops cooperating with the stop bars associated with said other groups of keys when said member is operated, means yieldingly urging said element into a position in which its said portions will not engage and move aside the related zero stops when said member is operated, manually controlled means for moving said element endwise on said member into a position such that when said member is operated to cause release of the zero stops associated with said one group of keys, said element will also simultaneously move the zero stops that release all of the other stop bars, and a total key connected to and operating said member in a manner to move aside said zero stops, whereby operation of said total key will normally operate the zero stops associated with said one group of keys to clear said primary totalizer, but when said element is moved by said manually controlled means, the operation of said member to clear said primary totalizer will move aside the zero stops for the stop bars associated with the grand totalizer and cause simultaneous clearance of that totalizer in the same cycle of operation with said primary totalizer.

7. In a calculating machine, a primary totalizer, a grand totalizer, a frame mounting said totalizers, a keyboard unit removably attached to said frame and having a group of keys selectively and manually operable into set positions, a group of stops carried by said unit and movable into and out of set positions, means carried by said unit and selectively coupling said stops and keys by which operation of any key into set position will operate a corresponding stop into set position, means carried by said frame and controlled by the set keys for running selected numbers set up by operation of said keys, into one of said totalizers, means carried by said frame and controlled by the set stops for running selected numbers set up by operation of said stops from said keys into said grand totalizer in the same cycle of operation in which said numbers are run into said primary totalizer, means including a control device that is carried by said keyboard unit for causing clearance of said primary totalizer and said grand totalizer, simultaneously in another cycle of operation, and means also carried by said unit and selectively movable to render said control device effective or ineffective to cause clearance of said grand totalizer with said primary totalizer.

8. In a calculating mechanism, a primary totalizer, a grand totalizer, a keyboard having two groups of keys, one for each totalizer with the keys of each group arranged in denominational rows, one of said groups of keys having operating buttons by which the keys in different rows may be operated selectively to set up numbers, means preventing access to the keys of the other group, means interconnecting each key of said one group with a corresponding key of the other group, whereby the setting up of a number in one group of keys will cause a corresponding number to be set up in the other group of keys, an individual stop bar for each denominational row of keys, means yieldingly urging each stop bar in one direction until stopped by any depressed key in that denominational row, a zero stop for each bar normally preventing any substantial movement of that bar but movable aside to release that bar, means operated by any key of each denominational row for moving the zero stop for the stop bar of that row to release that stop bar, means controlled by each stop bar for entering a number into the related totalizer depending upon the extent of movement of that stop bar, means for returning all stop bars to initial position just prior to the conclusion of a cycle of operation and for releasing said bars at the start of a new cycle of operation, a member mounted to extend crosswise of the rows of keys, mounted for limited movement, and having portions engageable with and moving aside the zero stops of said one group of keys, an element mounted on said member for limited movement thereon and having portions engageable with and moving aside each of the zero stops cooperating with the stop bars associated with said other groups of keys when said member is operated, means for selectively controlling the movement of said element on said member into and out of a position in which its said portions engage and move aside related zero stops when said member is operated, and means including a total key operating said member in a direction to move aside zero stops associated with said one group of keys when said primary totalizer is to be cleared and to also move aside the zero stops associated with said other group of keys, if the element has been positioned to cause their movement, when the grand totalizer is to be cleared.

9. In a calculating mechanism, of the type in which numbers to be run into a primary totalizer and also into a grand totalizer, are first set up in a keyboard unit having zero stops normally blocking operation of a running in mechanism but shiftable into positions to release said mechanism, the combination of a keyboard unit which comprises two groups of keys, one group for each totalizer, with the keys of each group arranged in denominational rows, the keys of one of said groups having operating buttons by which these keys may be operated selectively to set up numbers, means interconnecting each key of said one group with a corresponding key of the other group, whereby the setting up of a number in one group of keys will automatically set up a corresponding number in the other group, an individual zero stop for each denominational row of keys and individually operated by operation of any key of that denominational row, common means mounted for limited movement and operable when moved in one direction on the zero stops related to the keys of said one group for moving any of those zero stops of that group which have not already been moved by a key, means also connected to said common means and movable therewith in said limited movement, and also shiftable relatively to said common means into and out of a position in which it operates any of the zero stops related to the keys of said other group and not already moved by any of these keys, during such limited movement that causes operation of the zero stops related to said one group of keys, whereby the operation of said groups of zero stops may be together or one group alone, and means to control the position of the means which is connected to the common means, relative to the common means.

10. In a calculating mechanism, of the type in which numbers to be run into a primary totalizer and also into a grand totalizer, are first set up in a keyboard unit having zero stops normally blocking operation of a running in mechanism but shiftable into positions to release said mechanism, the combination of a keyboard unit which comprises two groups of keys, one group for each totalizer, with the keys of each group arranged in denominational rows, the keys of one of said groups having operating buttons by which these keys may be operated selectively to set up numbers, means interconnecting each key of said one group with a corresponding key of the other group, whereby the setting up of a number in one group of keys will automatically set up a corresponding number in the other group, an individual zero stop for each denominational row of keys and individually operated by operation of any key of that denominational row, common means mounted for limited movement and operable when moved in one direction on the zero stops related to the keys of said one group for moving any of those zero stops of that group which have not already been moved by a key, means also connected to said common means and movable therewith in said limited movement, and also shiftable relatively to said common means into and out of a position in which it operates any of the zero stops related to the keys of said other group and not already moved by any of these keys, during such limited movement, that causes operation of the zero stops related to said one group of keys, whereby the operation of said groups of zero stops may be together or one group alone, and means functionally separate from said common means and selectively operable to cause movement of said shiftable means into and out of its position in which it can move zero stops when said common means moves in one direction.

11. In a calculating machine, the combination of a primary totalizer; a separate grand totalizer; means for running selected numbers into said primary totalizer; means automatically controlled by said last-named means for also concomitantly running the same numbers into said grand totalizer; a total key; means controlled by said total key for causing a clearance of both totalizers in a common clearance operation; means for printing the numbers run into both totalizers and also for printing the total in said primary totalizer when that totalizer is cleared; other printing means for printing the total carried in said grand totalizer when said grand totalizer is cleared; means preventing the other printing means from printing the numbers run into both totalizers; and means for selectively preventing clearance of said grand totalizer with said primary totalizer and thereby preventing said other printing means from operating when the total in the primary totalizer is cleared.

12. In a calculating machine, the combination of a primary totalizer; a separate grand totalizer concealed from view of and inaccessible to the operator; means for running selected numbers into said primary totalizer; means automatically controlled by said last-named means for also concomitantly running the same numbers into said grand totalizer; a total key; means controlled by said total key for causing a clearance of both totalizers in a common clearance operation; means related to the primary totalizer for printing the numbers run into both totalizers and also for printing the totals in said primary totalizer when that totalizer is cleared; other means related to the grand totalizer for printing the total carried in said grand totalizer when said grand totalizer is cleared; means normally preventing said other printing means from printing the numbers entered into both totalizers; means operable by the total key for rendering the preventing means inoperable in a total clearance operation; and key-controlled means for selectively preventing clearance of said grand totalizer with said primary totalizer and thereby preventing said other printing means from printing a grand total in a total-taking operation in which only said primary totalizer is cleared.

13. In a calculating machine, the combination of a primary totalizer; a separate grand totalizer; a single set of amount keys; means for entering a selected number set up on said keys simultaneously into both of said totalizers in the same cycle of operation, said means including a plurality of zero stops for each of said totalizers; means including an element cooperating with the zero stops for said primary totalizer for controlling the entering means to clear the primary totalizer in a total-taking operation; means for printing in a single column only the numbers entered into said totalizers, and the total carried in said primary totalizer at the time it is cleared; a member mounted on said element and selectively movable thereon to a position to cooperate with the zero stops for said grand totalizer to cause the grand totalizer to be cleared in the same cycle of operation as said primary totalizer; and additional printing means for printing in a different column only the grand totals carried in said grand totalizer at the time it is cleared.

14. In a calculating machine, the combination of a primary totalizer; a separate grand totalizer; means for entering selected numbers simultaneously into both of said totalizers in a single cycle of operation; means for rendering the entering means operable to clear said primary totalizer in each total-taking operation; means for printing in a single column the numbers entered into said totalizers, and the total carried in said primary totalizer at the time it is cleared; a housing enclosing and protecting all of said means and totalizers, and concealing said grand totalizer from view; a lock-controlled member carried by said housing and operable by a key from the outside of said housing; means within said housing and rendered operable by said member, when operated, for rendering the entering means operable in the total-taking operation to clear said grand totalizer along with said primary totalizer; and other printing means for printing in another column only the grand total carried by the grand totalizer at the time it is cleared.

15. In a calculating machine, the combination of a primary totalizer; a grand totalizer; means for entering selected numbers simultaneously into both of said totalizers in amount-entering operations; means for causing said primary totalizer to be cleared at will by a total-taking operation; means for printing in a single column and upon at least two superposed strips of record material the numbers entered into said totalizers and the total carried in said primary totalizer at the time it is cleared, said strips of record material being of different widths; means selectively rendered operable in a total-taking operation to cause said grand totalizer to be cleared when the primary totalizer is cleared; means for printing, in a different column and upon the wider of said strips, the total carried in said grand totalizer at the time it is cleared; and means for automatically receiving and storing the wider of said strips after it is printed upon, whereby said wider strip provides a record of all entries into said totalizers and of each total in said primary totalizer each time that totalizer is cleared, and also provides a record of each total in the grand totalizer each time that totalizer is cleared, which record is retained in the machine, and the narrower of said strips provides a record of any group of numbers entered into the totalizers and the total of these numbers which has been accumulated in the primary totalizer, which record may be severed from the strip and handed to a customer.

16. A calculating machine comprising a primary totalizer; a grand totalizer; means for entering the same selected numbers simultaneously in both of said totalizers in successive cycles of operation; means for clearing said primary totalizer in a total-taking operation; a housing enclosing all of the foregoing; a platen; means for feeding a paper strip through a selected zone against said platen; a lock-controlled element extending through and mounted in said housing and accessible for operation from the outside of said housing; means operable in each total-taking operation and rendered effective by said lock-controlled element for causing clearance of said grand totalizer in the same operation with the clearance of said primary totalizer; said housing having a primary sight window therein through which the numbers on said primary totalizer only are visible to the operator, said housing also closing the grand totalizer from view from outside of the housing; and means for printing on said strip in one column in said zone the numbers entered in said totalizers in said successive cycles of operation, and the total carried by the primary totalizer at the time that totalizer is cleared, and in a different column the total carried by said grand totalizer when that totalizer is cleared.

17. In a calculating machine, the combination of a primary totalizer; a grand totalizer; mechanism including a plurality of zero stops for entering amounts into said primary totalizer; other mechanism including a plurality of zero stops for entering amounts into said grand totalizer; manually-operated means to control said mechanisms to simultaneously enter the same amount into both of said totalizers; means, including an element cooperating with the zero stops for said primary totalizer, for causing said primary totalizer to be cleared alone in a total-taking operation; and a slide carried by said element and movable to a position to cooperate with the zero stops for said grand totalizer to cause said grand totalizer to be cleared simultaneously with the primary totalizer in a grand-total-taking operation to insure that both totalizers will be cleared in a grand-total-taking operation and will be in condition to correctly accumulate a new grand total.

18. In a calculating machine, the combination of a primary totalizer; a grand totalizer; means, including a plurality of zero stops, for entering selected numbers simultaneously into both of said totalizers; a single total clearance key; means including an element operated by said key and cooperating with the zero stops for said primary totalizer for causing said primary totalizer to be cleared in a total-taking operation while said grand totalizer remains uncleared; a member slidably mounted on said element and movable to a position to cooperate with the zero stops for said grand totalizer for causing said grand totalizer to be cleared simultaneously with the clearing of said primary totalizer in a grand-total-taking operation; and means for selectively controlling the position of said member on said element to thereby render said member effective or ineffective to cause the grand totalizer to be cleared when said element is operated by said key.

19. In a machine of the class described, the combination of a primary totalizer; a grand totalizer; differentially operable means to operate the primary totalizer to enter amounts therein and to clear amounts therefrom; differentially operable means to operate the grand totalizer to enter amounts therein and to clear amounts therefrom; manipulative means to control both differentially operable means to cause the same amount to be entered simultaneously into both totalizers; means normally restraining both differentially operable means against substantial movement; means operable by the manipulative means to remove the restraining means in amount-entering operations; means, including a comb, operable in each total-taking operation to remove the restraining means for the differentially operable means which operates said primary totalizer, to allow this differentially operable means to clear the primary totalizer in each total-taking operation; and a tined element slidably mounted on said comb for operation therewith, and settable to be effective, when operated, to remove the restraining means for the differentially operable means which operates the grand totalizer, to allow this differentially operable means to clear the grand totalizer, or settable to be ineffective, when operated, to remove the restraining means for this differentially operable means, to prevent the operation of this differentially operable means to clear the grand totalizer, so that the grand totalizer may or may not be cleared along with said primary totalizer in a total-taking operation, depending upon whether or not the tined element is effective.

20. In a machine of the class described, the combination of a primary totalizer; a grand totalizer; differentially operable means to operate the primary totalizer to enter amounts therein and to clear amounts therefrom; differentially operable means to operate the grand totalizer to enter amounts therein and to clear amounts therefrom; manipulative means to control both differentially operable means to cause the same amount to be entered simultaneously into both totalizers; means normally restraining both differentially operable means against substantial movement; means operable by the manipulative means to remove the restraining means in amount-entering operations; additional means, including a comb, which are operable in each total-taking operation to remove the restraining means for the differentially operable means which operates said primary totalizer, to allow this differentially operable means to clear the primary totalizer in each total-taking operation; and means slidably mounted on said comb for operation therewith, and settable to be effective, when operated, to remove the restraining means for the differentially operable means which operates the grand totalizer to allow this differentially operable means to clear the grand totalizer, or settable to be ineffective, when operated, to remove the restraining means for this differentially operable means to prevent the clearing of the grand totalizer, so that while the grand totalizer may or may not be cleared along with said primary totalizer in a total-taking operation, depending upon whether or not the means mounted on said comb is effective, each time the grand totalizer is cleared, the primary totalizer will also be cleared, thus insuring that after a grand-total-taking operation both totalizers will be cleared and ready to begin the formation of a new grand total.

21. In a machine of the class described, the combination of a pair of totalizers, each of which may be set to represent amounts; differentially operable means to operate one of the totalizers to clear an amount therefrom; differentially operable means to operate the other totalizer to clear an amount therefrom; means normally restraining both differentially operable means against substantial movement; means, including a comb, operable in each total-taking operation to remove the restraining means for the differentially operable means which clears said one totalizer to allow said one totalizer to be cleared in each total-taking operation; and a toothed slide mounted on said comb for operation therewith, and settable to be effective, when operated, to remove the restraining means for the differentially operable means which clears the other totalizer to allow this differentially operable means to clear said other totalizer, or settable to be ineffective, when operated, to remove the restraining means for this differentially operable means to prevent the operation of this differentially operable means to clear the other totalizer, so that the other totalizer may or may not be cleared along with said one totalizer in a total-taking operation, depending upon whether or not the slide is effective.

22. In a machine of the class described, the combination of a pair of totalizers, each of which may be set to represent amounts; differentially operable means to operate one of the totalizers to clear an amount therefrom; differentially operable means to operate the other totalizer to clear an amount therefrom; means normally restraining both differentially operable means against substantial movement; means, including a comb, operable in each total-taking operation to remove the restraining means for the differentially operable means which clears said one totalizer to allow said one totalizer to be cleared in each total-taking operation; and a comb-like slide mounted on said comb for operation therewith, and settable to be effective, when operated, to remove the restraining means for the differentially operable means which clears the other totalizer, to allow this differentially operable means to clear said other totalizer, or settable to be ineffective, when operated, to remove the restraining means for this differentially operable means to prevent the operation of this differentially operable means to clear the other totalizer, so that the other totalizer may or may not be cleared along with said one totalizer in a total-taking operation, depending upon whether or not the slide is effective.

HARRY L. LAMBERT.

REFERENCES CITED

The following references are of record in the file of this patent:

UNITED STATES PATENTS

| Number | Name | Date |
| --- | --- | --- |
| 823,474 | Macauley | June 12, 1906 |
| 1,016,276 | Kilpatrick | Feb. 6, 1912 |
| 1,793,155 | Britten Jr. | Feb. 17, 1931 |
| 1,865,147 | Shipley | June 28, 1932 |
| 1,039,130 | Hopkins | Sept. 24, 1912 |
| 1,209,857 | Landseidel | Dec. 26, 1916 |
| 1,455,555 | Sundstrand | May 15, 1923 |
| 1,608,145 | Tingley | Nov. 23, 1926 |

FOREIGN PATENTS

| Number | Country | Date |
| --- | --- | --- |
| 688,221 | France | Aug. 20, 1930 |